United States Patent
Borglum et al.

[11] Patent Number: 6,139,985
[45] Date of Patent: Oct. 31, 2000

[54] ELECTRODE ELECTROLYTE INTERLAYERS CONTAINING CERIUM OXIDE FOR ELECTROCHEMICAL FUEL CELLS

[75] Inventors: Brian P. Borglum, Edgewood; Norman F. Bessette, N. Huntingdon, both of Pa.

[73] Assignee: Siemens Westinghouse Power Corporation, Orlando, Fla.

[21] Appl. No.: 09/122,291

[22] Filed: Jul. 24, 1998

[51] Int. Cl.[7] .............................. H01M 8/12; H01M 4/88
[52] U.S. Cl. ................................. 429/41; 429/30; 429/33
[58] Field of Search .................... 429/30, 41, 33

[56] References Cited

U.S. PATENT DOCUMENTS

| | | | |
|---|---|---|---|
| 4,490,444 | 12/1984 | Isenberg | 429/31 |
| 4,597,170 | 7/1986 | Isenberg | 29/623.5 |
| 4,609,562 | 9/1986 | Isenberg et al. | 427/8 |
| 4,894,297 | 1/1990 | Singh et al. | 429/31 |
| 5,106,706 | 4/1992 | Singh et al. | 429/31 |
| 5,516,597 | 5/1996 | Singh et al. | 429/30 |
| 5,527,633 | 6/1996 | Kawasaki et al. | 429/30 |
| 5,985,476 | 11/1999 | Waschman et al. | 429/33 |

*Primary Examiner*—Carol Chaney
*Attorney, Agent, or Firm*—Eckert Seamans Cherin & Mellott, LLC

[57] ABSTRACT

An electrochemical cell is made having a porous fuel electrode (16) and a porous air electrode (13), with solid oxide electrolyte (15) therebetween, where the air electrode surface opposing the electrolyte has a separate, attached, dense, continuous layer (14) of a material containing cerium oxide, and where electrolyte (16) contacts the continuous oxide layer (14), without contacting the air electrode (13).

11 Claims, 5 Drawing Sheets

ELECTRODE ELECTROLYTE INTERLAYERS CONTAINING CERIUM OXIDE FOR ELECTROCHEMICAL FUEL CELLS

GOVERNMENT CONTRACT CLAUSE

The Government of the United States of America has rights in this invention pursuant to Contract No. DE-FC26-97FT-34139, awarded by the United States Department of Energy.

BACKGROUND AND SUMMARY OF THE INVENTION

Solid oxide electrolyte fuel cells ("SOFC") of the tubular variety have been under investigation for over 20 years, are well known in the art, and are taught, for example, in U.S. Pat. No. 4,490,444 (Isenberg). The SOFC tube generally contains an inner, porous, self supporting "air" electrode in contact with oxidant in operation, upon which are disposed a dense electrolyte, usually of yttria stabilized zirconia, and an outer "fuel" electrode in contact with a fuel in operation. In some instances, the air electrode can have a separate, porous, inner support.

In producing these SOFC tubes, sophisticated chemical/electrochemical vapor deposition techniques ("CVD/EVD") are used to deposit the electrolyte and fuel electrode, as taught in U.S. Pat. Nos. 4,609,562 (Isenberg et al.) and 4,597,170 (Isenberg) respectively. The apparatus used for these depositions includes means for controlling the pressure and flow rate of gaseous reactants on both sides of the porous air electrode, a manometer for measuring the difference in pressure between the gaseous reactants on each side of the electrode, and means for changing the difference in pressure between the gaseous reactants. The vapor used to form the yttrium stabilized zirconia will contain a specific percentage of yttrium and zirconium chloride, which metal halide, upon contact with oxygen as another gaseous reactant will form this appropriate electrolyte metal oxide coating on the air electrode. As the metal oxide reaction product grows on the substrate, it closes off the pores in the substrate by chemical vapor deposition (CVD). The coating then continues to grow by electrochemical vapor deposition (EVD), because oxygen as ions move from the source of oxygen gas through the growing, dense electrolyte film.

In some instances an additional film of metal oxides selected from Mg, Ca+Al, Sr+Al, Zr, Y, Ce and their mixtures is formed on the outside fuel electrode, to prevent carbon formation, as taught in U.S. Pat. No. 4,894,297 (Singh et al.)

Also, a porous, discontinuous coating of cerium oxide ($CeO_2$), in discrete particle form can be deposited at the air electrode interface with the electrolyte, as taught in U.S. Pat. No. 5,106,706 (Singh et al.) This particulate interface is used to help prevent partial air electrode encapsulation at the interface after SOFC operation at 1,000° C., and to inhibit oxygen reduction reactions and reduce oxygen loss from air electrode particles during SOFC operation. These cerium oxide particles are deposited in a separate vacuum infiltration step, by precipitation from a hydroxide solution, and deposit in the air electrode pores. The particles are from 0.01 micrometer to 0.1 micrometer diameter, and are smaller than the sintered air electrode particles for ease of impregnation.

It has been found that during CVD formation of the electrolyte through the cerium oxide ($CeO_2$) coating, the oxidant that flows through the pores of the air electrode tube may cause some $CeO_2$ particulates to be displaced from the air electrode pores and surface, thus reducing the number of particles and the effectiveness of the layer. Additionally, metal halide vapors and by-products of the reaction, namely chlorine or hydrochloric acid can attack the discrete $CeO_2$ particles, converting a portion of them to $CeCl_3$ vapor and thus transport them out of the system. Both of these phenomena may be aggravated because of the high surface area $CeO_2$ particles are not firmly affixed to the air electrode tube surface. As a result, not as much $CeO_2$ may be on the air electrode surface as may be desired. Additionally, since $CeO_2$ resides in the pores, it may not protect the entire electrochemical surface area and therefore may not produce the maximum performance/lifetime enhancement.

It is also known, that even with the current $CeO_2$ particulate coating, after long-term electrical testing, the air electrode has been found to show structural changes in terms of porosity formation and densification. This is accelerated by high current operation. Such undesirable structural changes in the air electrode near the air electrode/electrolyte interface are postulated to be due to changes in the oxygen stoichiometry of the air electrode. This is thought to be aggravated by the 'point contact' nature of the air electrode/particulate $CeO_2$ electrolyte interface. Accelerated life tests at 1200° C. have also shown degradation in performance with little increase in vacuum leak rate. It has been postulated that this degradation is due to the formation of undesirable insulating interfacial layers, such as $La_2Zr_2O_7$. This formation may also be aggravated by point contact $CeO_2$ sites.

Ideally, it would be beneficial to have $CeO_2$ prevent intimate contact between the air electrode and the electrolyte. Cells with this type of microstructure could potentially exhibit better performance and lifetime characteristics due to a more uniformly distributed current density as well as improved protection of the interface.

Therefore, it is one of the main objects of this invention to reduce oxygen loss from the air electrode particles that are in contact with the electrolyte, increase the active area for the electron exchange reactions with oxygen at the electrode/electrolyte interface, to prevent formation of insulating interfacial layers, and to isolate the air electrode from the electrolyte. It would also be highly advantageous, if possible, to reduce the number of steps in the SOFC production process to reduce cost and make the SOFC more commercially viable.

In accordance with this objective, the present invention resides in an electrochemical cell comprising a porous fuel electrode and a porous air electrode, with solid oxide electrolyte therebetween, characterized in that the air electrode surface opposing the electrolyte has a separate, attached, dense continuous layer of a material comprising cerium oxide, and where electrolyte contacts the continuous cerium oxide layer, without contacting the air electrode.

The invention also resides in a chemical and electrochemical vapor deposition process for forming ceramic coatings on a porous ceramic air electrode substrate, where one of the coatings comprises a dense, continuous layer comprising cerium oxide, comprising the steps of: providing a first gaseous reactant comprising of oxygen on one side of said substrate which permeates through the pores in said substrate and reacts with a second gaseous reactant comprising cerium halide, that is provided on the other side of said substrate; passing additional of the first gaseous reactant to also directly contact the second gaseous reactant; and closing the pores by forming a dense, continuous layer comprising cerium oxide on the other side of the substrate.

An additional electrolyte layer can then be formed on top of the cerium oxide layer using appropriate electrolyte forming precursor gaseous halides and passing the first gaseous reactant only through the substrate followed by forming a final layer of a porous cermet (metal-ceramic) fuel electrode.

The continuous layer of cerium oxide is in solid film form, from approximately 0.001 micrometer to 5.0 micrometers thick. The oxide interface coating is from 90% to 100% of theoretical density, and is essentially continuous and integral with the electrolyte layer and tightly bonded to the air electrode. The preferred electrochemical cell is a tubular fuel cell.

The continuous layer of, for example, dense cerium oxide, provides a more effective means to prevent encapsulation of or substantial penetration into the porous air electrode structure by the electrolyte material than prior art methods. Improved voltage—current and power—current characteristics are also shown as well as decreased sensitivity of electrical resistance vs. temperature, which may allow wider temperature cell operation. Also, very importantly, a separate infiltration step is eliminated and the interlayer is formed as part of the vapor deposition of the electrolyte, which can cut production costs very substantially. While the invention is described with regard to tubular fuel cells, if appropriate deposition apparatus were to be designed, the invention would also be useful for flat plate and other fuel cell configurations.

BRIEF DESCRIPTION OF THE DRAWINGS

In order that the invention can be more clearly understood, convenient embodiments thereof will now be described, by way of example, with reference to the accompanying drawings in which.

DESCRIPTION OF THE EMBODIMENTS

Figure 1:
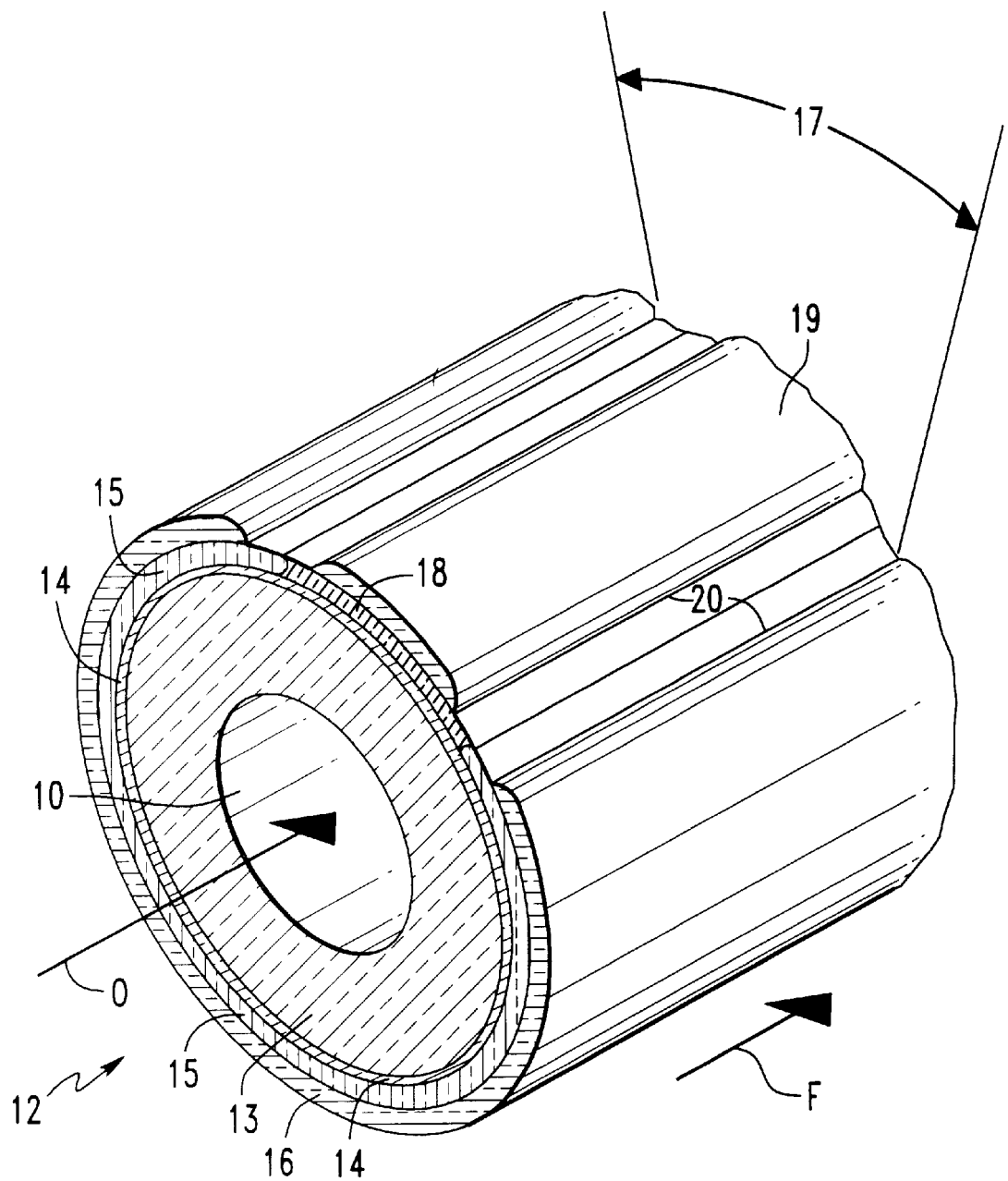
FIG. 1 is an isometric view in section of a preferred, tubular, solid oxide fuel cell which can be made according to this invention.

Referring now to FIG. 1 of the drawings, air or oxygen O, flowing through the open interior 10 of electrochemical cell 12, for example, an operating high temperature fuel cell, permeates through the porous air electrode 13 to contact a dense, thin film comprising a cerium oxide layer 14 forming a separating, interface layer between air electrode 13 and dense electrolyte 15.

The oxygen is converted to oxygen ions at the surface of cerium oxide layer 14. The oxygen ions are then conducted through both the oxygen ion conducting cerium oxide layer 14 and electrolyte 15 to fuel electrode 16 where they react with Fuel F, to generate electricity. Also shown in the drawing are: longitudinal space 17, containing an axially elongated interconnection 18 which extends down a narrow axial segment of the tube, for making electrical connections from the underlying air electrode to the fuel electrode of a cell tube (not shown) lying next to it, and an electronically insulating gap 20. A metal or fuel electrode type of material 19 can be coated over interconnection 18. A plurality of these cells can be electrically connected together to provide a generator.

The air electrode 13, is a typically tube of porous, doped lanthanum manganite, hereinafter "lanthanum manganite", usually formed by extrusion and sintering. This layer is usually 1500 micrometers to 3,000 micrometers thick, having sintered particle diameters from about 1 micrometer to about 15 micrometers . Electrolyte 15 is preferably an oxide having a fluorite structure or a mixed oxide in the perovskite family, but other simple oxides, mixed oxides, or mixtures of simple and mixed oxides can be used. The preferred electrolyte material is a stabilized zirconia based ceramic, a readily available commercial material.

An outer, porous, cermet fuel electrode 16 is deposited over a substantial portion of the electrolyte 15 as shown in FIG. 1. To form the fuel electrode, particles of an electronic conductor are applied to the electrolyte surface, then a skeleton of yttrium and zirconium oxide is grown around the particles by a modified electrochemical vapor deposition process. The preferred particles are nickel, cobalt, and alloys and mixtures thereof, as these metals are stable, sulfur resistant, and have an acceptable oxidation potential. The fuel electrode can also be applied by any other method so long as it is porous and retains other appropriate physical and electrochemical properties. The electrolyte is also applied by a chemical/electrochemical vapor deposition process using two reactant gases.

Figure 2:
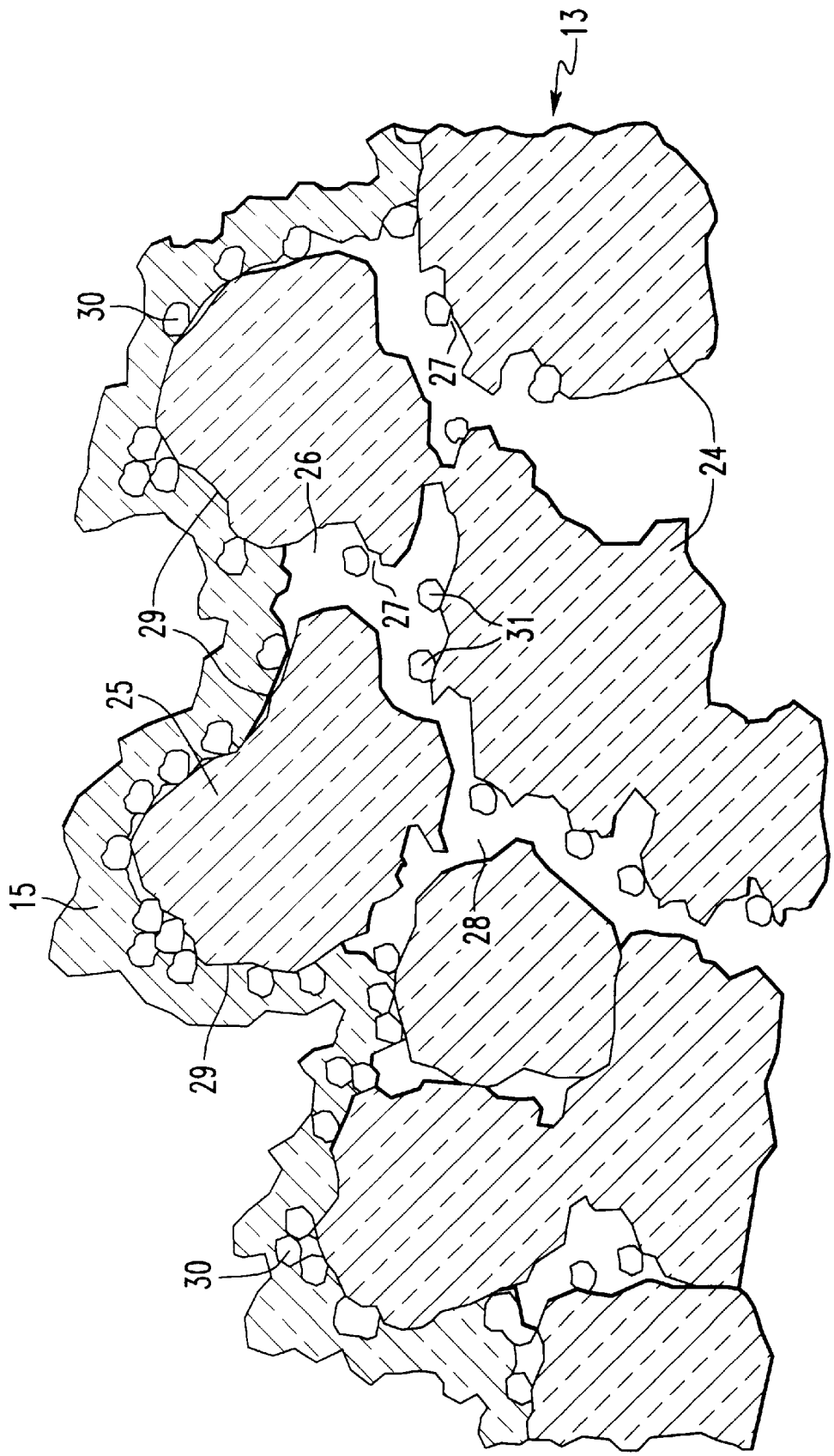
FIG. 2 is an idealized cross-section of the air electrode-electrolyte interface of the fuel cell of FIG. 1, showing the prior art, porous, discontinuous electrolyte nucleating layer at the beginning of electrolyte deposition.

FIG. 2 is an idealized portion of the air electrode 13 with prior art, discrete, porous deposits of cerium oxide particles 31, as taught in U.S. Pat. No. 5,106,706 (Singh et al.) These particles 31 are discontinuously dispersed, as shown, with about 90% within the top 50 micrometers of the air electrode 13. As can be seen, most of the particles are loosely attached as at points 27, and electrolyte 15 contacts air electrode particles 24 at substantial contact points 29, along the air electrode surface.

In FIG. 3, again, an idealized portion of the air electrode 13 is shown, but here, a continuous cerium oxide interlayer 14 is seen, with solid oxide electrolyte 15 just beginning to nucleate, grow over the interlayer surface and expand outward in thickness as shown by the arrows. The cerium oxide interlayer 13 is shown dotted for contrast and clarity.

As can be seen, the cerium oxide interlayer 13 is a continuous layer. By "continuous", is meant over the exterior portions of the air electrode particles 24 to form an essentially complete barrier between the air electrode particles and the electrolyte 15. Pore entrances 33, however, will remain open even though there is some CeO$_2$ intrusion and deposition into such pore entrances as shown. Therefore, the air electrode will remain porous, that is from 50% to 85% of theoretical density. Use of the term "cerium oxide" is meant to include doped or undoped CeO$_2$. A minor amount of rare earth dopant, such as for example, Zr, Pr, Nd, and Sm, and their mixtures may be included, to increase the ionic and/or electronic conductivity of the CeO$_2$.

Since vapor deposition deposits a tightly adherent interface film 14, rather than the poorly attached particles 31 shown in FIG. 2, the CVD/EVD process will not dislodge interior particles 31 to reduce cerium oxide content near the interface. Also, since the deposition of the interface film 14 is in a continuum with electrolyte deposition, the attachment between the interface film 14 and the electrolyte 15 is excellent.

Both the interface cerium oxide film 14 and the electrolyte 15 are deposited generally by the method described by U.S. Pat. No. 4,609,562 (Isenberg et al.—the '562 Patent) herein incorporated by reference, a figure of which is shown as FIG. 4 of the drawings in this specification. Generally the system is evacuated to a pressure in the range of 0.01 to 20 torr, preferably from about 0.1 to 5 torr (1 torr=1 mm of Hg). Starting materials will be bars of $CeCl_3$, which will be vaporized in an evaporator, beyond valve 44 and not shown in FIG. 4. Such vapor will be fed to the envelope space 42 of the CVD/EVD reactor 40 as the second, metal halide gaseous reactant. This $CeCl_3$ reacts with first gaseous reactant oxidant, such as oxygen, passed through valve 46, immediately followed by vaporizing solid bars of appropriate by mixed materials to deposit the electrolyte, such as bars of $ZrCl_4$ and $YCl_3$. However, during deposition of the $CeO_2$ coasting only, excess oxidant from inside the air electrode 13 is passed through tube 48 and valve 50, shown in FIG. 4. After formation of the cerium oxide interlayer said valve 50 is closed, creating a differential pressure in the range of about 25 torr to about 150 torr.

As a further description of the process, a first gaseous reactant containing a source of oxygen, such as free oxygen, water vapor, carbon dioxide, and the like, passes through a valve 46 into the bottom inside of the air electrode tube 13. Excess oxidant can leave the tube by mears of a conduit 48 and valve 50 and travels out of the system through exit valve 54. The second gaseous reactant of $CeCl_3$ is admitted to the outside of the air electrode tube through a conduit controlled by a valve 44. The $CeCl_3$ vapor passes over the surface of the air electrode tube 13 in the annular space 42. A manometer 52 is connected between the excess oxidant conduit and the envelope volume to measure the difference in pressure between the first and second reactants. Exit valve 54 is also shown.

In the process, excess oxidant is allowed to pass through the control valve 50 and out of the system through valve 54. Immediately after the appropriate thickness of $CeO_2$ is formed, excess oxidant is forced through the air electrode tube 13 by closing valve 50, and $ZrCl_4$ and $YCl_3$ gases are introduced as the second gaseous reactant to interact with ionic oxygen at the $CeO_2$ film surface and deposit by EVD reaction to form the electrolyte. Allowing the excess oxidant to travel out of the system having $CeO_2$ growth minimizes the differential pressure that could give rise to a porous CVD growth between the $CeO_2$ and the electrolyte and also helps decrease thickness variations. Using this method resulted in uniform, dense $CeO_2$ and electrolyte deposits of 90% to 100% of theoretical density, generally close to 100% of theoretical density.

The thickness of the $CeO_2$ interface film can range from about 0.001 micrometer to about 5.0 micrometers, with a preferred range of from about 0.001 micrometer to about 1.0 micrometers. Thicknesses over 5.0 micrometers tend to cause a problem due to mismatch of thermal expansion with the electrolyte. This problem is solved within the preferred thickness range and of even less concern within the most preferred thickness range of from about 0.001 micrometer to 0.1 micrometers.

Figure 3:
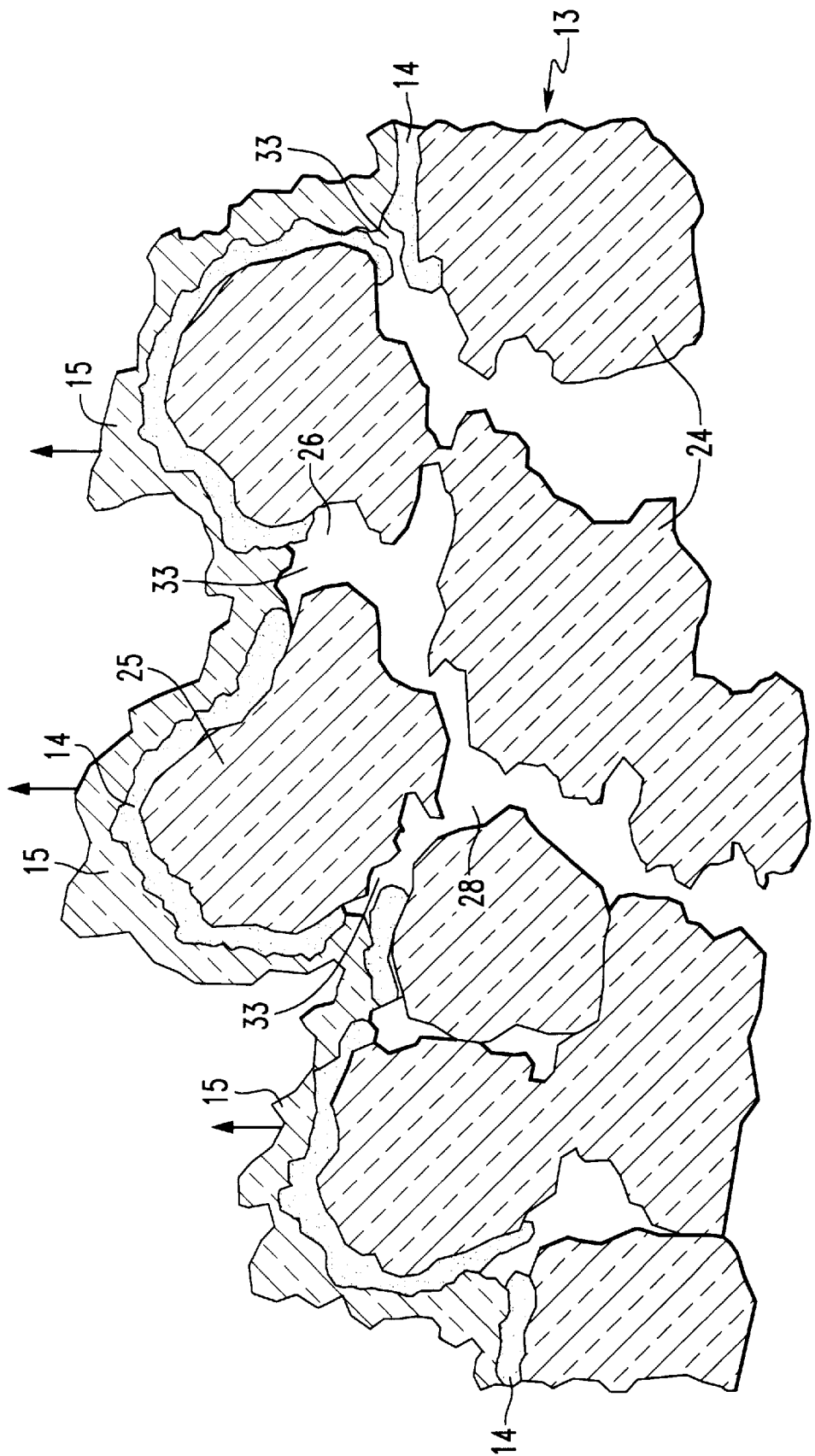
FIG. 3, which best shows the invention, is an idealized cross-section of the air electrode-electrolyte interface of the fuel cell of FIG. 1, showing the continuous, dense, cerium oxide layer of this invention at the beginning of electrolyte deposition, where there is no contact of electrolyte with the air electrode.

While not shown in FIG. 3, the strategy for interfacial modification can be extended to the electrolyte—fuel electrode interface. For example, during the last stages of electrolyte growth, $CeO_2$ or an alternate material having appropriate ionic/electronic conducting properties could be introduced into the EVD reaction chamber. This would coat the outer portion of the electrolyte with this oxide onto which the fuel electrode would then be deposited, and such $CeO_2$ could provide enhanced performance characteristics. The invention will now be illustrated by the following nonlimiting Examples.

COMPARATIVE EXAMPLE 1

Figure 4:
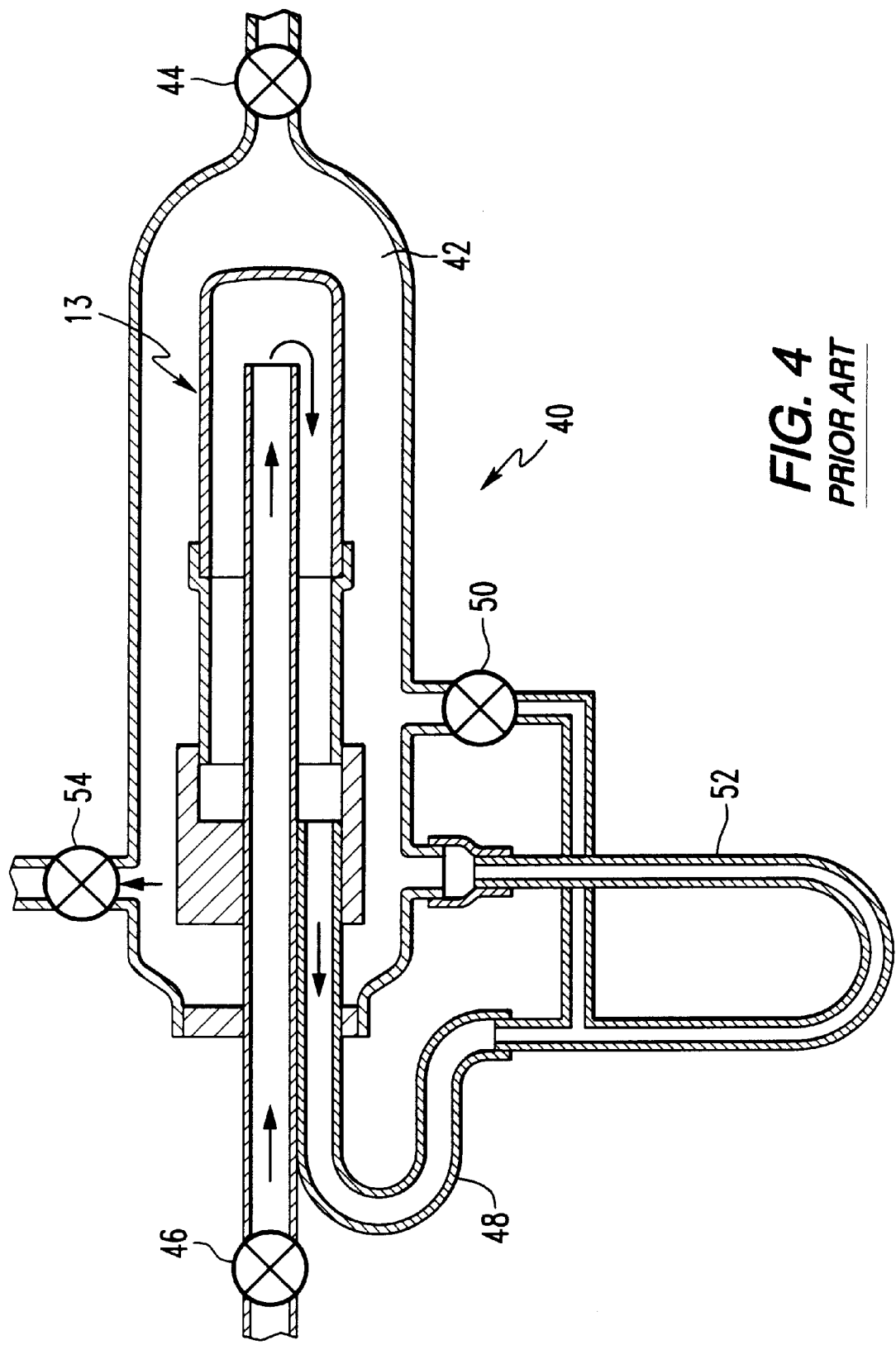
FIG. 4 is a diagrammatic side view in section of a prior art vapor deposition apparatus of the type useful to deposit the interface layer of this invention.

Experimental runs, using an apparatus somewhat similar to that shown in FIG. 4, operating at about 1100° C. to 1300° C., and an evacuated system pressure of between 0.1 torr to 5 torr, were conducted. Here $CeO_2$ was deposited by vapor deposition. Both small and large diameter, 67 cm long air electrode tubes were processed in these (EVD) runs, and they did not have vacuum infiltrated $CeO_2$ at the air electrode/electrolyte interface. Instead, the initial chloride feed was from $CeCl_3$ bars, followed by standard yttrium-doped zirconium chloride electrolyte bars.

It was discovered that the oxidant by pass valve (50 in FIG.4) of the EVD system must be kept open during the delivery of the $CeCl_3$ vapor. The by pass valve connects the two sides of the air electrode and is a means of controlling the pressure differential between the inside and outside of the air electrode and the flow of oxidant through the porous tube wall. This is in contrast to the method described in U.S. Pat. No. 4,609,562 (Isenberg et al.) In this way, the axial distribution of $CeO_2$ can be kept constant. If the valve is closed, it was discovered that non-dense deposits are formed that vary in thickness along the length of the cell. Rather, the bypass valve is open while the entire $CeCl_3$ bar is delivered, the valve is then closed, $Ycl_3$ and $ZrCl_4$ are then introduced, and the run is performed in the normal manner.

During a comparative first run, all of the oxidant was forced through the pores (by pass valve 50 closed) before the introduction of chlorides into the system, as typical of all electrolyte EVD runs. This run exhibited a sluggish pore-closure (about 3 minutes) that did not occur until the $CeCl_3$ bar was consumed.

It is assumed that the lower oxygen ionic conductivity of $CeO_2$ relative to the yttrium-stabilized zirconia to electrolyte limits the deposition of $CeO_2$ primarily to the less dense chemical vapor deposition (CVD) growth mode, rather than the highly dense EVD mode. The appearance of these cells varied axially. At the closed and open ends the deposited material was whiter in color, while the mid-length was uniformly dark. Microstructural analysis revealed that the closed end section exhibited a uniform growth thickness of $CeO_2$ over the electrode. However, regions where there were open pores (due to slow close-off) a non-dense CVD-type deposit occurred. This was followed by normal deposition of electrolyte.

EXAMPLE 2

Based on the observations in Comparative Example 1, additional cells were processed in a run conducted in a different manner, at an evacuated system pressure of between 0.1 torr. to 5 torr. In particular, the by pass valve 50 in FIG. 4 was kept open to minimize the differential pressure that could give rise to non-dense CVD interlayer growth between the $CeO_2$ and the electrolyte, and to improve the oxygen partial pressure distribution along the length of the cell during close-off to decrease thickness variations. After delivery of the $CeCl_3$ the bypass valve was closed, the differential pressure was allowed to increase to a level of 65 torr, and the run was completed in the normal manner.

This run exhibited pore closure in about 53 seconds after the bypass valve was closed, at a differential pressure of 65 torr. Usually pore closure occurs at differential pressures over about 25 torr. Additionally, the cells were dark in color and uniform in appearance along their entire length. Pholomicrographs were taken, and a continuous, dense band of $CeO_2$, about 0.15 micrometer thick, was visible between the air electrode and the electrolyte in all axial locations. It was clear that the vapor phase deposition of $CeO_2$ improves the contact between $CeO_2$ and the air electrode and passivates the air electrode surface, protecting it from chloride attack and the formation of deleterious insulating phases. These experiments were conducted in an attempt to improve the air electrode/electrolyte interface via dense EVD coating, and thereby enhance electrical performance.

Four fuel cells were made in this manner and all have microstructures similar to that described in the preceding paragraph. Two large diameter cells have operated for more than 4,500 hours with very good performance and no signs of voltage degradation. These cells were tested at 1,000° C. in an 89% $H_2$–11% $H_2O$ fuel gas mixture with air oxidant.

Figure 5:
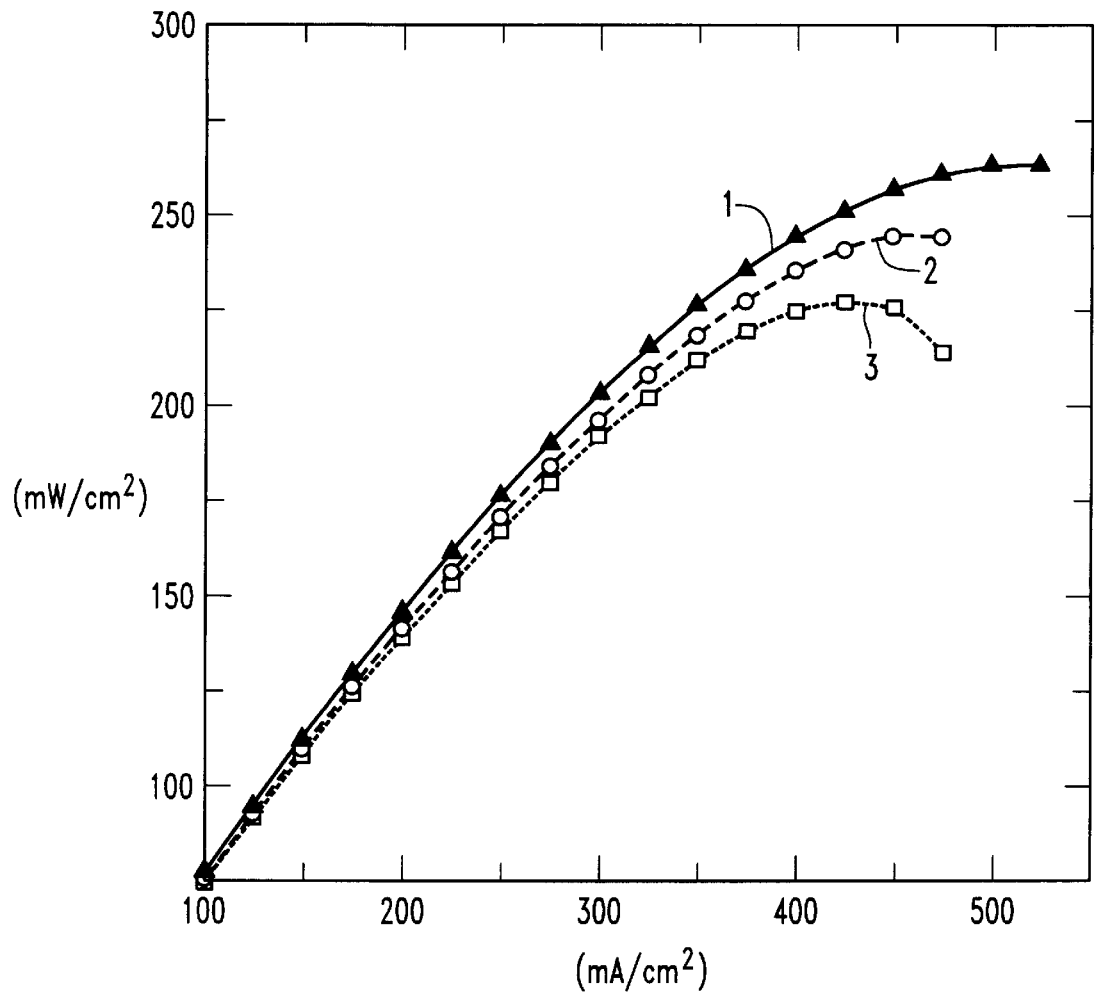
FIG. 5 is a graph of power output (mW/cm$^2$) vs. current density (mA/cm$^2$) of a fuel cell having a continuous interlay consisting essentially of CeO$_2$ (curve 1) vs. a fuel cell having a deposit of particulate CeO$_2$ (curve 2) and a fuel cell having no Ceo$_2$ at all (curve 3) where this data is the same type as shown on FIG. 3 of U.S. Pat. No. 5,106,706 (Singh et al.)

Fuel cells made with large diameters and these $CeO_2$ films, (curve numbered 1 in FIG. 5) were also tested and compared with similar sized fuel cells made with $CeO_2$ particulate deposits (curve numbered 2 in FIG. 5) and with a similar sized fuel cell with no $CeO_2$ at all (curve numbered 3 in FIG. 5). As shown in FIG. 5, the power output—current density ($mW/cm^2$–$mA/cm^2$) characteristics of the cell of this invention (curve 1) are better than cells made with conventional vacuum infiltrated $CeO_2$ particules(curve 2) or no $CeO_2$ (curve 3).

FIG. 5 shows a comparison somewhat similar to that of FIG. 3 in U.S. Pat. No. 5,106,706 at the same test conditions but using the larger diameter cell tubes. The values of the curves of FIG. 5 of this application vs. the '706 curves are different because these larger diameter tubes have more internal cell resistance. As can be seen, however, the continuous film $CeO_2$ (curve 1) provides the best results.

Additionally, these cells were thermally cycled five times between 1000° C.–600° C.–1000° C., and exhibited no voltage degradation. This indicates that the difference in thermal expansion between $CeO_2$ and the other cell components ($CeO_2$ is higher) can be accommodated since the $CeO_2$ layer is thin. Additionally, two small diameter cells were tested for more than 800 hours and also exhibited good performance. The cell voltage-current characteristics and resistance indexes were measured as a function of temperature from 750° C. to 1000° C. and the results indicated that the cell resistance has a decreased sensitivity to temperature and may allow for wider temperature cell operation.

It was also determined that the performance of the cell with $CeO_2$ deposited by EVD was 100 mV higher at 800° C. than the standard cell with vacuum infiltrated $CeO_2$ under the same testing conditions. This decreased sensitivity of resistance to temperature will result in direct SOFC generator capital cost reduction. During the recent tests of an experimental 100 kWe generator, with a vacuum infiltrated $CeO_2$ interface, the average cell temperature was 925° C. Operating a standard cell at 300 $mA/cm^2$ at this temperature on 89/11-hydrogen/water, would result in a voltage of 621 mV. For a cell with $CeO_2$ deposited through EVD at the same conditions, the cell voltage would be 643 mV. This represents a very substantial 3.5% increase in efficiency for the overall system. Increased efficiency directly translates to fewer cells for a given generator capacity and leads to lower generator capital cost.

This invention also has larger potential benefits with respect to lifetime performance. The $CeO_2$ layer deposited by EVD uniformly covers the air electrode particles. In Example 2, in describing the invention, the $CeO_2$ layer deposited by EVD was 0.15 micrometer thick. This is in contrast to the $CeO_2$-infiltrated cells, in which the $CeO_2$ resides for the most part in the pores. It is postulated that the presence of a dense $CeO_2$ interface film aids in the air electrode/electrolyte electron exchange reaction. voltage of 621 mV. For a cell with $CeO_2$ deposited through EVD at the same conditions, the cell voltage would be 643 mV. This represents a very substantial 3.5% increase in efficiency for the overall system. Increased efficiency directly translates to fewer cells for a given generator capacity and leads to lower generator capital cost.

This invention also has larger potential benefits with respect to lifetime performance. The $CeO_2$ layer deposited by EVD uniformly covers the air electrode particles. In Example 2, in describing the invention, the $CeO_2$ layer deposited by EVD was 0.15 micrometer thick. This is in contrast to the $CeO_2$-infiltrated cells, in which the $CeO_2$ resides for the most part in the pores. It is postulated that the presence of a dense $CeO_2$ interface film aids in the air electrode/electrolyte electron exchange reaction.

This $CeO_2$ EVD technique also eliminates a processing step in cell manufacture. This results in a simplified process to make tubular SOFCs and has a direct effect on reducing cell cost.

We claim:

1. An electrochemical cell comprising a porous fuel electrode, and a porous air electrode in the form of sintered particles, with solid oxide electrolyte therebetween, where the air electrode surface opposing the electrolyte has a separate, attached, continuous layer of a material which consists essentially of doped and undoped cerium oxide, having a density from about 90% to 100% of theoretical density, and where the electrolyte contacts the continuous cerium oxide layer, without contacting the air electrode.

2. The cell of claim 1, where the fuel electrode is nickel-zirconia, the electrolyte is a zirconia based ceramic, and the air electrode is doped lanthanum manganite.

3. The cell of claim 1, in tubular fuel cell configuration.

4. The cell of claim 1, where the air electrode is from 1,500 micrometers to 3,000 micrometers thick, and the cerium oxide layer is a solid, electrochemical vapor-deposited film having a thickness of about 0.001 micrometer to about 5.0 micrometers, which uniformly covers the air electrode particles.

5. The cell of claim 1, where the cerium oxide layer has a thickness from about 0.001 micrometer to about 1.0 micrometer.

6. The cell of claim 1, where a layer comprising cerium oxide is also disposed between the electrolyte and the fuel electrode.

7. A plurality of the cells of claim 1, electrically connected together.

8. A tubular fuel cell comprising a porous cermet fuel electrode, and a porous doped lanthanum manganite air electrode in the form of sintered particles, with solid ceramic oxide electrolyte therebetween, where the air electrode surface opposing the electrolyte has a separate, attached, continuous layer of a material consisting essentially of doped or undoped $CeO_2$ having a density from about 90% to 100% of theoretical density, and having a thickness from about 0.001 micrometer to 1.0 micrometer, and where electrolyte contacts the continuous cerium oxide layer, without contacting the air electrode.

9. A plurality of the cells of claim 8, electrically connected together, where the layer of $CeO_2$ is a solid, electrochemical vapor-deposited film, which uniformly covers the air electrode particles.

10. A chemical and electrochemical vapor deposition method for forming ceramic coatings on a porous ceramic air electrode substrate in the form of sintered particles, where one of the coatings comprises a continuous layer comprising cerium oxide, comprising the steps: providing a first gaseous reactant comprising oxygen on one side of said substrate which permeates through the pores in the substrate and reacts with a second gaseous reactant comprising cerium halide that is provided on the other side of the substrate; and passing additional of the first gaseous reactant to also directly contact the second gaseous reactant; and closing the pores by forming a continuous vapor-deposited, solid film layer comprising cerium oxide, having a density from about 90% to 100% of theoretical density, on the other side of the substrate.

11. The method of claim 10, where an electrolyte layer is formed on top of the cerium oxide layer and a porous cermet fuel electrode is formed on top of the electrolyte layer, and the continuous cerium oxide film is formed primarily by electrochemical vapor deposition and uniformly covers the air electrode particles.

* * * * *